United States Patent Office 3,140,184
Patented July 7, 1964

3,140,184
EDIBLE MATERIALS CONTAINING WATER SOLUBLE DEXTRIN FORMING COMPLEXES
Frederick M. Robbins, Congers, N.Y., assignor to General Foods Corporation, White Plains, N.Y., a corporation of Delaware
No Drawing. Filed Oct. 29, 1959, Ser. No. 849,455
13 Claims. (Cl. 99—28)

This invention relates to complexes, or inclusion compounds, to the preparation of the same, and to their use.

It particularly relates to complexes for protecting or including organic compounds, not as such, but in a form readily convertible to such compounds.

As is known, compounds like alcohols, aldehydes, and ketones are important in many applications; for example, they are used as flavors and/or aromas in many foods, frequently being characteristic of the freshness or fresh-tasting character of the food. A disadvantage attending the use of these compounds, both in foods and in other applications, is that they are more or less susceptible to change, or to escape, or to be lost in some way, such that they do not remain long in a given environment. It has been found desirable to bind these compounds by inclusion in complex-forming substances such as the cyclic dextrins; however, many of the compounds are of a molecular size which is too small to allow them to be held in the cyclic dextrins in suitable concentrations, if they are held at all. According to the present invention, it is proposed to bind these compounds, not per se, but in a form which is readily converted to the alcohol, aldehyde or ketone. More particularly, it is proposed to bind the compounds in the form of acetals and ketals which, when released from the complex, may be converted by a simple hydrolysis step, the acetals giving alcohols and aldehydes, and the ketals yielding alcohols and ketones. A particular advantage of the invention is that the acetals and ketals may be hydrolyzed to the simpler compounds at substantially the same time that they are released from the complex.

Essentially, and in brief, the invention comprises a complex in dry form comprising a water-soluble complex-forming cyclic dextrin having molecularly included therein a compound of the formula R'C(M)(OR)$_2$ wherein, preferably, R' and R are alkyl groups and M is a radical selected from the group consisting of hydrogen and alkyl. Mixtures of complexes are contemplated, as described below.

Considering the complex-forming materials, the cyclic dextrin may be one or more of a series of cyclic polymers of glucose units joined by alpha, 1→4 glycosidic bonds. More particularly, the series may comprise oligomers having 6, 7, 8, 9 or 10 alpha-D-glucopyranose units. The cyclic dextrin having 6 units is known as the alpha cyclic dextrin or cyclohexaamylose; the 7-unit compound is beta cyclic dextrin or cycloheptaamylose; the 8-unit compound is gamma cyclic dextrin or cyclooctaamylose. Similarly the delta and epsilon dextrins have 9 and 10 units. The cyclic dextrins, also called the Schardinger dextrins, are hollow cylindrical molecules having the property of molecularly including within their lumens or bores a variety of compounds. The resulting complexes, or inclusion compounds, are stable combinations wherein the cyclic dextrin molecule physically envelops the included molecule. It is though that the principal forces acting to hold the two molecules together result from the spatial fitting of the molecules, but that secondary electrostatic forces may also tend to hold them together. The cyclic dextrins are soluble in water, the gamma dextrin having greater solubility in water than the alpha, which in turn is more soluble than the beta. All are bland in taste and odor, are white in color and have a physical appearance similar to starch.

In regard to the compounds that are included by the cyclic dextrins, namely, those defined by the formula noted, R'C(M)(OR)$_2$, these are actals when M is hydrogen and ketals when M is alkyl. The radicals R' and R are alkyl groups, but in a special case, R' may also be hydrogen, as where the acetal is methylal, CH$_2$(OMe)$_2$. The radical R' may be aryl or aralkyl as well as alkyl. Acetals and ketals may also be classed as gem-diethers, or geminatediethers, as they may have two identical ether groups (OR) attached to the same carbon atom, although it is to be understood that the ether groups can also be dissimilar.

Besides conventional acetals and ketals, there may be used such acetal derivatives as olefinic, acetylenic, ketene, halo, hydroxy, alkoxy, amino, cyano, and other substituted acetals. Ketal derivatives include halo, keto, hydroxy, alkoxy, amino, and other substituted ketals. As may be apparent, the foregoing derivatives have at least one additional functional group over and above the acetal or ketal groups. Other functional groups may be present, such as carbmethoxyl or carbethoxyl and like groups, and nitro groups.

Specific acetals include methylal, glycolformal, methyl ethyl formal, acetaldehyde dimethyl acetal, acetaldehyde ethylene acetal, methyl n-propyl formal, acetaldehyde diethyl acetal (acetal), propionaldehyde diethyl acetal, n-butyraldehyde diethyl acetal, n-heptaldehyde ethylene acetal, benzaldehyde ethylene acetal, furfural diethyl acetal, thiophene 2-aldehyde diethyl acetal, cyclohexyl-acetaldehyde diethyl acetal, benzaldehyde diethyl acetal; also unsaturated acetals such as crotonaldehyde dimethyl acetal, acrolein diethyl acetal, 1,1-diethoxy-2-butyne, iso-butenal diethyl acetal, acetaldehyde diallyl acetal, alpha-pentenal diethyl acetal, and alpha-isopentenal diethyl acetal. Other suitable compounds are ketene acetals like ketene dimethyl acetal, ketene diethyl acetal, n-propyl-ketene dimethyl acetal, methylketene diethyl acetal, n-propylketene diethyl acetal, phenylketene dimethyl acetal; and halo acetals such as chloroacetaldehyde dimethyl acetal, bromoacetaldehyde dimethyl acetal, chloroacetaldehyde ethylene acetal, methyl beta-chloroethyl formal, beta-bromopropionaldehyde ethylene acetal, chloroacetaldehyde diethyl acetal, and bromoacetaldehyde diethyl acetal. Still other compounds are ether acetals as illustrated by beta-methoxy-n-butyraldehyde dimethyl acetal, ethoxyacetaldehyde diethyl acetal, n-butoxyacetaldehyde diethyl acetal, phenoxyacetaldehyde diethyl acetal, and p-methoxybenzaldehyde diethyl acetal; also amino acetals like aminoacetaldehyde diethyl acetal, beta-aminopropion-aldehyde diethyl acetal, and methylaminoacetaldehyde diethyl acetal. Other substituted acetals are glycolic aldehyde diethyl acetal, diethoxyacetamide, diethoxy-acetonitrile, piperonylic acid, methyl 2-nitrophenyl formal, cyclohexylglyoxal diethyl acetal, and phenylglyoxal diethyl acetal.

Specific ketals comprise acetone ethylene ketal, methyl ethyl ketone ethylene ketal, acetone diethyl ketal, 2-hexanone dimethyl ketal, methyl isobutyl ketone ethylene ketal, cyclopentanone diethyl ketal, 3-octanone dimethyl ketal, cyclohexanone diethyl ketal, acetophenone ethylene ketal; also halo ketals such as chloroacetone ethylene ketal, bromoacetone ethylene ketal; hydroxy ketals like 2,2-dimethoxy-1-propanol; 3,3-dimethoxy-2-methyl-2-butanol; alkoxy ketals like beta-methoxyethyl methyl ketone dimethyl ketal, beta-ethoxyethyl methyl ketone diethyl ketal; and other substituted ketals such as ethyl acetoacetate ethylene ketal, 5,5-dimethoxy-5-phenyl-1-pentene, etc.

As may be apparent, the foregoing acetals or ketals upon hydrolysis will yield a variety of alcohols and aldehydes or ketones, particularly the more volatile, low molecular weight members of these classes of compounds.

The complexes may be prepared by adding a small amount of acetal and/or ketal to an aqueous solution of one or more cyclic dextrins, allowing the mixture to reach a state of equilibrium, and then removing the water, as by freeze drying, spray drying, or other suitable manner. The amount of cyclic dextrin that is used to prepare the complex, relative to the diether compound, may vary from a weight ratio of 0.1:1 to 40:1, preferably 5:1 to 20:1. In the complex itself, the amount of diether present is usually on the order of about 7 to 11% by weight of complex. It will be understood, in this connection, that mixtures can be prepared in which the amount of diether is less than 7%, going down to 1%, or 0.1%, by simply adding cyclic dextrin to a complex; also, mixtures are possible in which the diether content is 15, 20, or 30% or more by simply adding diether. Usually, cyclic dextrins having a larger bore, such as the gamma and epsilon cyclic dextrins, tend to include more diether compound. As will be apparent, the includable compounds are soluble in water at least to an extent to enable them to be included by the dextrins when added to an aqueous solution of the latter. If mixtures of complexes are to be made, then all of the cyclic dextrins are mixed with one or more includable compounds to produce an overall mixture of complexes.

The complexes are water-soluble. As indicated by Example 1 below, they are stable during the operation of freeze drying, which is carried out at high vacuum. The cyclic and acyclic dextrins do not contribute to any appreciable extent to the taste or odor of the complexes nor, when the complexes are added to an edible material, to the taste and/or plasticity of the material.

To use a complex, that is, to dissociate it, it is only necessary to shake the same with acidified water. For example, where the complex comprises a cyclic dextrin and an acetal, the complex dissociates in water to yield the acetal and the cyclic dextrin, and the acetal in turn hydrolyzes in the acidified water to yield an aldehyde and an alcohol. Where the acetal is acetaldehyde diethyl acetal, the aldehyde produced on hydrolysis is acetaldehyde and the alcohol is ethanol. Any acid may be used to acidify the water, and the amount of acid need only be sufficient to provide an acid pH, although the amount can be more than this. As may be apparent, the alcohol and aldehyde are formed in situ, and either or both compounds are available for use. The complex, rather than the alcohol and/or aldehyde, can be stored over periods of time and under conditions at which it would not be feasible, or even possible, to keep the alcohol and aldehyde owing to the tendency of these compounds to change, or to escape, or to be lost in some way. A particular advantage of the invention is that while some alcohols and aldehydes are too small, molecularly speaking, to be included in the cyclic dextrins, at least at substantial levels of concentration, the acetals, on the other hand, can be included in the cyclic dextrins at high concentration levels.

In the event that the complex comprises a cyclic dextrin and a ketal, the complex dissociates in water to yield the ketal and the cyclic dextrin, and the ketal in turn hydrolyzes in the acidified water to yield a ketone and an alcohol. For example, if the ketal is dimethyl ketal of acetone, the ketone produced on hydrolysis is acetone and the alcohol is methanol. The advantages of a cyclic dextrin-ketal are as described for the acetal complex.

Illustrative of the use of the complexes is their addition to edible materials. In one case an acetal-containing complex may be added to an orange-flavored dry beverage mix comprising sugar, an edible acidic substance, and a clouding agent. The sugar may be sucrose or other suitable material. The edible acidic substance may be an edible acid like citric, tartaric, adipic, fumaric and similar oxy-acids, as well as salts and acid salts of these acids such as sodium citrate, sodium tartrate, and the like, and mixtures of these acids, salts, and acid salts. The clouding agent may be a dried emulsion of a plastic fat and a hydrophilic encapsulating colloidal material; the plastic fat is a fat which is semi-solid at room temperature, that is, it is a product comprising a mixture of fats and oils, and it may be compounded in any suitable way such as by hydrogenating vegetable oils like coconut oil. Stearin in an amount of 6% may be added to the plastic fat. The hydrophilic colloidal material may be a water-soluble gum like gum arabic, gum tragacanth, gum acacia and the like. Tricalcium phosphate may be added to the dry beverage mix as well as an alkali metal salt of carboxymethyl cellulose, and trisodium citrate. When the complex-containing mix is dissolved in water, the beverage has an enhancing fresh note characteristic of the odor and flavor of fresh oranges. As may be apparent, some of the solid complex dissolves until an equilibrium is established between the solid and dissolved complex, and the dissolved complex dissociates to yield the acetal. As the aqueous mixture has an acid pH, the acetal immediately begins to hydrolyze, producing ethanol and acetaldehyde. And as acetal is thus used up, additional amounts of dissolved complex dissociate to form additional amounts of acetal to replace that hydrolyzed, and in turn additional amounts of solid complex dissolve to re-establish the equilibrium with the dissolved complex. In this way the acetal molecules are released from the complex in a slow controlled way to provide a substantially even and uniform concentration of acetal hydrolysis products over an extended time.

In respect of the acetaldehyde hydrolysis product, it is apparent that the acetaldehyde, being a volatile compound, could not be incorporated per se into a dry beverage mix.

If desired, the foregoing dry mix can be first dissolved in water and the complex then added. Whether incorporated in the dry mix or the aqueous solution of the same, the amount of acetaldehyde added may be as desired to suit the individual taste, for example, 1 to 5 or 10 mg. or more of complex per glass of aqueous beverage.

In a similar way, suitable complexes may be incorporated in other fruit-flavored beverages such as soft drinks.

The complexes can also be added to solid as well as liquid materials. In some cases it may be desirable to employ two or more complexes in a material, each complex including a different compound. The dextrin may be the same in all the complexes so used or it may be different. In this connection when a solid edible material incorporating a complex is dissolved in water, or chewed, the complex, which at least to some extent is soluble in saliva as well as water, dissociates to yield the included compound. Such solubility of the complex may vary from that of difficultly soluble complexes to that of appreciably soluble complexes, but in any event the solubility is sufficient so that on dissociation of the dissolved complex and hydrolysis of the released constituents, the resulting product or products are noticeable to the taste.

*Example 1*

About 500 mg. of beta-cyclic dextrin were dissolved in 40 ml. of water to which there had been added a drop of 0.1 N caustic soda to avoid having water with an acid pH. Acetal (acetaldehyde diethyl acetal) in an amount of 0.3 ml. was then added to the solution. The container for the solution was immediately stoppered and shaken vigorously to obtain a homogeneous solution. Then another solution was prepared by dissolving 1.0 gm. of alpha-cyclic dextrin in 40 ml. of water to which had been added one drop of 0.1 N caustic soda. The same acetal in an amount of 0.5 ml. was added to the resulting solution, and the container was stoppered and shaken vigorously to obtain a homogeneous solution. Both solutions were then frozen and lyophilized overnight, to produce, respectively, beta-cyclic dextrin-acetal and alpha-cyclic dextrin-acetal complexes in dry form. These were analyzed colorimetrically using 10 mg. of each complex per 100 ml. of water, and each complex was found to have bound 10% by weight of acetal. A second analysis using 30 mg. of complex per 100 ml. of water showed the beta-cyclic dextrin complex to have 9.6% by weight of bound acetal and the alpha-cyclic dextrin complex to have 9.1% of acetal. The colorimetric analysis was run in the following way: To 1 ml. of aqueous sample solution containing 0.1 mg. (or 0.01% by weight) of dissolved complex, there were added 1.0 ml. of a saturated alcoholic solution of 2,4-dinitrophenylhydrazine and one drop of concentrated hydrochloric acid, the resulting solution was mixed, and then heated for 30 minutes at 50° C. After heating, 10.0 ml. of 10% potassium hydroxide in 70% alcohol was added, and the color was read at 480 millimicrons on a spectrophotometer. The concentration was read off a previously prepared color concentration curve. The foregoing assay is based on the method described by Snell et al. in "Colorimetric Method of Analyses," vol. 3, page 253, D. Van Nostrand Co., Inc., New York, 1953.

*Example 2*

About 2.5 mg. of the beta-cyclic dextrin complex of Example 1 was added to 6.7 gm. of a dry orange-flavored beverage mix comprising sucrose, citric acid, and a cloud-forming agent. When the mix was dissolved in about 50 ml. of water, the beverage had the characteristic odor and flavor of fresh oranges and was judged to be superior in these respects over a beverage prepared in exactly the same way but in which the complex was omitted.

*Example 3*

A beta-cyclic dextrin-acetal complex in an amount of 14 mg. was added to 47 grams of the dry beverage mix described in Example 2, and the mixture was dissolved in about 50 ml. of water to produce a pleasant-tasting beverage having the characteristic odor and flavor of fresh oranges. The acetal comprised about 10% by weight of the complex. When this beverage was allowed to stand for about one and a half hours and then tasted, it was found still to possess a refreshing and satisfactory taste. In another test, the dry mixture of the beverage mix and the complex was stored for two months before being dissolved in water to produce the beverage, and it was found that the resulting beverage was unaffected by the storage of the dry mixture.

Besides the cyclic dextrins, acyclic dextrins may be used to form the complexes. The acyclic dextrins comprise the products obtained by reacting starch, preferably potato starch, and water in the presence of alpha amylase to an extent that is defined (1) by the cold water solubility of the product and (2) by the color reaction of the product with a dilute aqueous solution of iodine. More particularly, the reaction may be allowed to proceed until a point is reached which lies between that point where the product just becomes soluble in cold water and gives a purple color with iodine and that point where the product is still soluble in cold water but no longer gives any color with iodine. The latter is referred to as the achroic point. The reaction may be carried out at a temperature of about 20 to 75° C., preferably 70° C., and at a pH of 4 to 9, preferably 7. It may be noted that the reaction is stopped by heating the mixture to boiling to destroy the enzyme, which in turn stops the reaction. The reaction product, termed an acyclic dextrin, comprises a heterogeneous mixture of oligoglucans.

Besides potato starch, other useful starches for preparing the acyclic dextrins are tapioca starch, corn starch, amioca starch, wheat starch, sago starch, rice starch, etc. Initially, the starch may be gelatinized or not; if ungelatinized, it will become gelatinized because before it is reacted with water in the presence of alpha amylase, the starch, while suspended in the water, is first heated to 70° C. or above and brought to a gel form. More particularly, the starch can be first suspended in water and the suspension heated to boiling until thinning begins, after which it can be cooked under pressure. However, any known method of dispersing the starch in water can be used.

The acyclic dextrins are thought to be hollow spirally shaped molecules having the property of molecularly including numerous compounds within the bore of the spiral. The size of the bore, i.e., its diameter, is considered to be more or less fixed. The resulting complexes, as in the case of the cyclic dextrin complexes, are stable combinations wherein the dextrin molecule physically engulfs the included molecule. In regard to the forces which hold the two molecules together, and in regard to their taste, odor, color, and physical appearance, the complexes are like the cyclic dextrin complexes described above.

The amounts of acyclic dextrin that is used to prepare a complex, relatively to a diether compound, may vary from a weight ratio of 0.3:1 to 20:1, preferably 2:1 to 10:1. In the complex itself, the amount of included compound present is usually on the order of about 5 to 7% by weight of complex, although mixtures can be prepared in which the amount of compound is less than 5%, going down to 1%, or 0.1%, by simply adding acyclic dextrin to a complex; and similarly, mixtures can also be prepared having more than 5% by weight of compound, going up, say, to 10, 15, or even 30% by weight.

Mixtures of the complexes are contemplated, and such mixtures may comprise two or more cyclic dextrin complexes, or two or more acyclic dextrin complexes, or one or more cyclic dextrin complexes plus one or more acyclic dextrin complexes.

Preferably, acetals and ketals of smaller molecular size are included by the acyclic dextrins, the intermediately sized compounds by the alpha and/or beta cyclic dextrins, and the larger sized compounds by the gamma and larger-bore cyclic dextrins.

In addition to acetals and ketals, the included compound may also be any hemiacetal which is stable enough to be included by the cyclic and acyclic dextrins. The formula of such hemiacetals may be written as R'C(M)(OR)(OH), from which it will be seen that one of the ether groups of the acetal formula

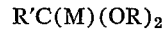

$$R'C(M)(OR)_2$$

has been replaced by an OH group. Stated another way, the radical R in the last-noted formula may be selected from hydrogen and alkyl but one of the two R radicals is alkyl. More generically, it should be said that at least one of the two R radicals of the last-noted formula is alkyl. As examples of hemiacetals there may be mentioned the following: the bis hemiacetal (melting point, 78–80° C.) formed by reacting 1,2-propanediol with two mols of chloral; the bis hemiacetal (melting point, 97–99° C.) formed by reacting 2,2-diethylpropan-1,3-diol with two mols of chloral; the hemiacetal produced by reacting lauryl alcohol and lauryl aldehyde; hemiacetals of the formula $CX_3CH(OH)OR$, wherein X is a halogen like chlorine, bromine, or fluorine and R is alkyl, aryl, or aralkyl; and also cyclic hemiacetals like 2-hydroxy-4-methyl-5-allyl-tetrahydrofuran.

In some cases, acylals may serve as the included compound. These are compounds having the formula of the acetals except that in the two OR groups, one or both of the R radicals is acyl, RCO, rather than alkyl.

Besides having application in foods, the complexes of the invention may be suitable for non-food use. For example, they may be employed in cosmetics, as by incorporating them in solid deodorant preparations. When such a preparation is applied, for example, to the armpit area, the complex may be broken down by the aid of perspiration to release, say, the acetal, and, in turn, the aldehyde and alcohol, one or both the latter being chosen for its pleasant odor.

It is to be understood that the invention is not restricted to the foregoing specific details but is capable of obvious variations without departing from its scope.

The following is claimed:

1. An aqueous beverage comprising an edible acid substance, water, and a complex comprising a water-soluble complex-forming dextrin having molecularly included therein a compound of the formula $$R'C(M)(OR)_2$$

wherein R is a radical selected from the group consisting of hydrogen and lower alkyl and at least one of which is lower alkyl, R' is a radical selected from the group consisting of hydrogen, lower alkyl, aryl, and aralkyl, and M is a radical selected from the group consisting of hydrogen and lower alkyl, said dextrin being selected from the class consisting of cyclic dextrins, acyclic dextrins, and a mixture of cyclic and acyclic dextrins, the amount of said complex being sufficient to provide, upon dissociation of the complex in the aqueous beverage and release and hydrolysis of the included compound, a quantity of hydrolysis product that is noticeable to the taste.

2. A dry beverage mix comprising an edible acidic substance selected from the group consisting of edible acids, salts and acid salts of said edible acids and mixtures thereof, and a complex in dry form comprising a water-soluble complex-forming dextrin having molecularly included therein a compound of the formula $$R'C(M)(OR)_2$$

wherein R is a radical selected from the group consisting of hydrogen and lower alkyl and at least one of which is lower alkyl, R' is a radical selected from the group consisting of hydrogen, lower alkyl, aryl, and aralkyl, and M is a radical selected from the group consisting of hydrogen and lower alkyl, said dextrin being selected from the class consisting of cyclic dextrins, acyclic dextrins, and a mixture of cyclic and acyclic dextrins, the amount of said complex being sufficient to provide, upon dissociation of the complex in an aqueous medium and release and hydrolysis of the included compound, a quantity of hydrolysis product that is noticeable to the taste.

3. An edible material characterized by the presence of at least one water-soluble flavor constituent, said material containing a complex comprising a water-soluble complex-forming dextrin having molecularly included therein a compound of the formula $R'C(M)(OR)_2$, wherein R is a radical selected from the group consisting of hydrogen and lower alkyl and at least one of which is lower alkyl, R' is a radical selected from the group consisting of hydrogen, lower alkyl, aryl, and aralkyl, and M is a radical selected from the group consisting of hydrogen and lower alkyl, said dextrin being selected from the class consisting of cyclic dextrins, acyclic dextrins, and a mixture of cyclic and acyclic dextrins, the amount of said complex being sufficient to provide, upon dissociation of the complex in an aqueous medium and release and hydrolysis of the included compound, a quantity of hydrolysis product that is noticeable to the taste.

4. An aqueous beverage as claimed in claim 1, said beverage further including a cloud-forming agent.

5. An aqueous beverage as claimed in claim 1, said edible acid being selected from the group consisting of citric acid, tartaric acid, adipic acid, fumaric acid and mixtures of said acids.

6. A dry beverage mix as claimed in claim 2, said mix further including a cloud-forming agent.

7. A dry beverage mix as claimed in claim 2, said edible acidic substance being selected from the group consisting of citric acid, tartaric acid, adipic acid, fumaric acid, salts of said acids, and mixtures of said acids and said salts.

8. A dry beverage mix as claimed in claim 2, in which said included compound is acetaldehyde diethyl acetal.

9. A dry beverage mix as claimed in claim 2, in which said included compound is a hemiacetal.

10. A dry beverage mix as claimed in claim 2, in which said complex-forming dextrin is a cyclic dextrin.

11. A dry beverage mix as claimed in claim 10, in which the ratio of said cyclic dextrin to said included compound is from about 0.1:1 to 40:1.

12. A dry beverage mix as claimed in claim 10, in which the ratio of said cyclic dextrin to said included compound is from about 5:1 to 20:1.

13. An edible material in which is incorporated a beta cyclic dextrin having molecularly included therein acetaldehyde diethyl acetal.

References Cited in the file of this patent

UNITED STATES PATENTS

| | | |
|---|---|---|
| 2,006,003 | Schoeller et al. | June 25, 1935 |
| 2,107,559 | Beck | Feb. 8, 1938 |
| 2,157,632 | Schapiro | May 9, 1939 |
| 2,404,763 | Gaver | July 23, 1946 |
| 2,497,579 | Bried | Feb. 14, 1950 |
| 2,603,569 | Alther | July 15, 1952 |
| 2,691,591 | Brenner | Oct. 12, 1954 |
| 2,868,646 | Schapiro | Jan. 13, 1959 |